(12) United States Patent
Huggett et al.

(10) Patent No.: US 6,414,866 B2
(45) Date of Patent: *Jul. 2, 2002

(54) ACTIVE FILTER FOR A CONVERTER HAVING A DC LINE

(75) Inventors: Colin Huggett, Torrance; Gabor Kalman, Palos Verdes, both of CA (US)

(73) Assignee: AlliedSignal Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/440,107

(22) Filed: Nov. 15, 1999

(51) Int. Cl.[7] .................................................. H02N 7/00
(52) U.S. Cl. .......................................... 363/124; 363/80
(58) Field of Search ........................... 363/124, 89, 80, 363/21, 27, 74; 323/222, 237, 282, 283, 290; 237/556, 552

(56) References Cited

U.S. PATENT DOCUMENTS

| | | | | |
|---|---|---|---|---|
| 3,612,914 A | * | 10/1971 | Evans | 327/545 |
| 4,172,277 A | * | 10/1979 | Pinson | 363/124 |
| 5,638,263 A | * | 6/1997 | Opal et al. | 363/65 |
| 5,668,464 A | * | 9/1997 | Krein et al. | 323/259 |
| 5,745,001 A | * | 4/1998 | Ueshima et al. | 327/553 |
| 5,926,063 A | * | 7/1999 | Nayebi et al. | 327/553 |
| 5,960,207 A | * | 9/1999 | Brown | 363/98 |
| 6,031,299 A | * | 2/2000 | Stumfall et al. | 307/106 |

* cited by examiner

Primary Examiner—Rajnikant B. Patel
(74) Attorney, Agent, or Firm—William J. Zak, Jr. Esq.

(57) ABSTRACT

An active filter is coupled to a dc line of a converter such as a dc-dc converter. The active filter traps a harmonic frequency component of chopped current on the dc line. A passive EMI filter may also be coupled to the dc line to remove higher harmonic frequency components of the chopped current on the dc line.

20 Claims, 5 Drawing Sheets

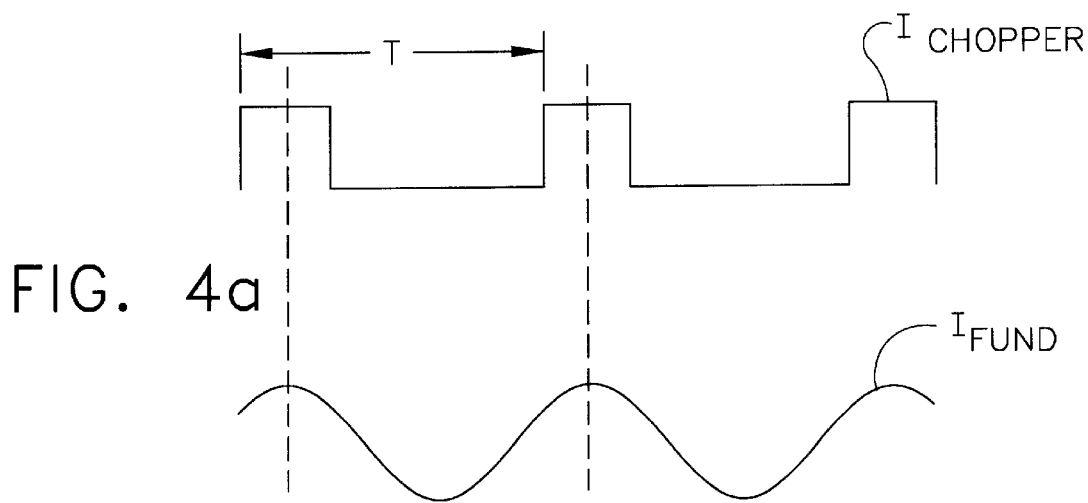
FIG. 4a
FIG. 4b
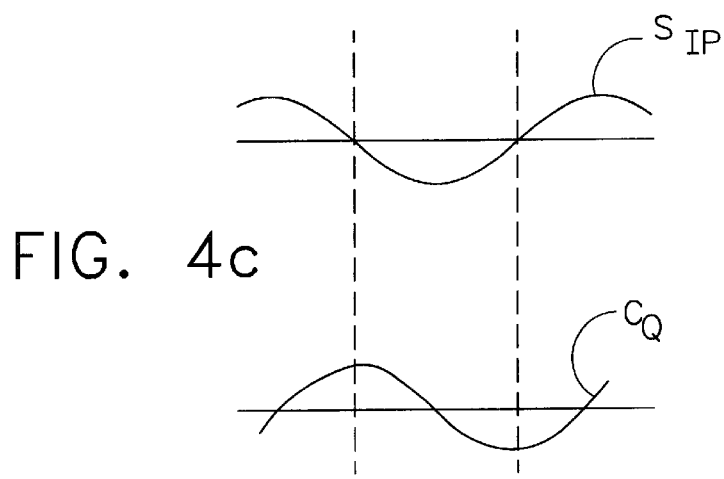
FIG. 4c
FIG. 4d

ACTIVE FILTER FOR A CONVERTER HAVING A DC LINE

BACKGROUND OF THE INVENTION

The present invention relates to electrical power supplies. More specifically, the invention relates to a converter having a dc line.

A down chopper of a dc-dc converter receives dc current from a dc power supply, modulates or "chops" the current to reduce current amplitude, and provides the chopped current on a dc line. The reduction in current is proportional to duty cycle of the chopping.

On-off action of the down chopper creates a pulse train-type pattern in the chopped current. Consequently, the chopped current on the dc line contains harmonic frequency content.

The dc-dc converter may also include an EMI filter for reducing the harmonic content to acceptable limits. A conventional EMI filter includes passive inductance, capacitance and resistance elements, the values of which are determined by power rating, chopping frequency and filter attenuation requirements. The EMI filter typically constitutes a significant amount of the overall weight of the dc-dc converter.

Reducing the weight of EMI filters for dc-dc converters used in aircraft would be very desirable. Reducing the weight would lower aircraft fuel consumption. Lowering the fuel consumption, in turn, would lower the cost of flying the aircraft.

SUMMARY OF THE INVENTION

According to one aspect of the present invention, an apparatus includes a converter having a dc line, and an active filter coupled to the dc line. The converter is operable to provide a pulsed current on the dc line at a chopping frequency; and the active filter is operable to trap a fundamental of the pulsed current. The active filter allows a substantially smaller passive filter to remove remaining harmonic frequency components.

BRIEF DESCRIPTION OF THE DRAWINGS

FIGS. 4a to 4d are illustrations of chopper duty cycle, chopper fundamental current, a sine wave reference signal, and a cosine wave reference signal, respectively.

DETAILED DESCRIPTION OF THE INVENTION

Figure 1:
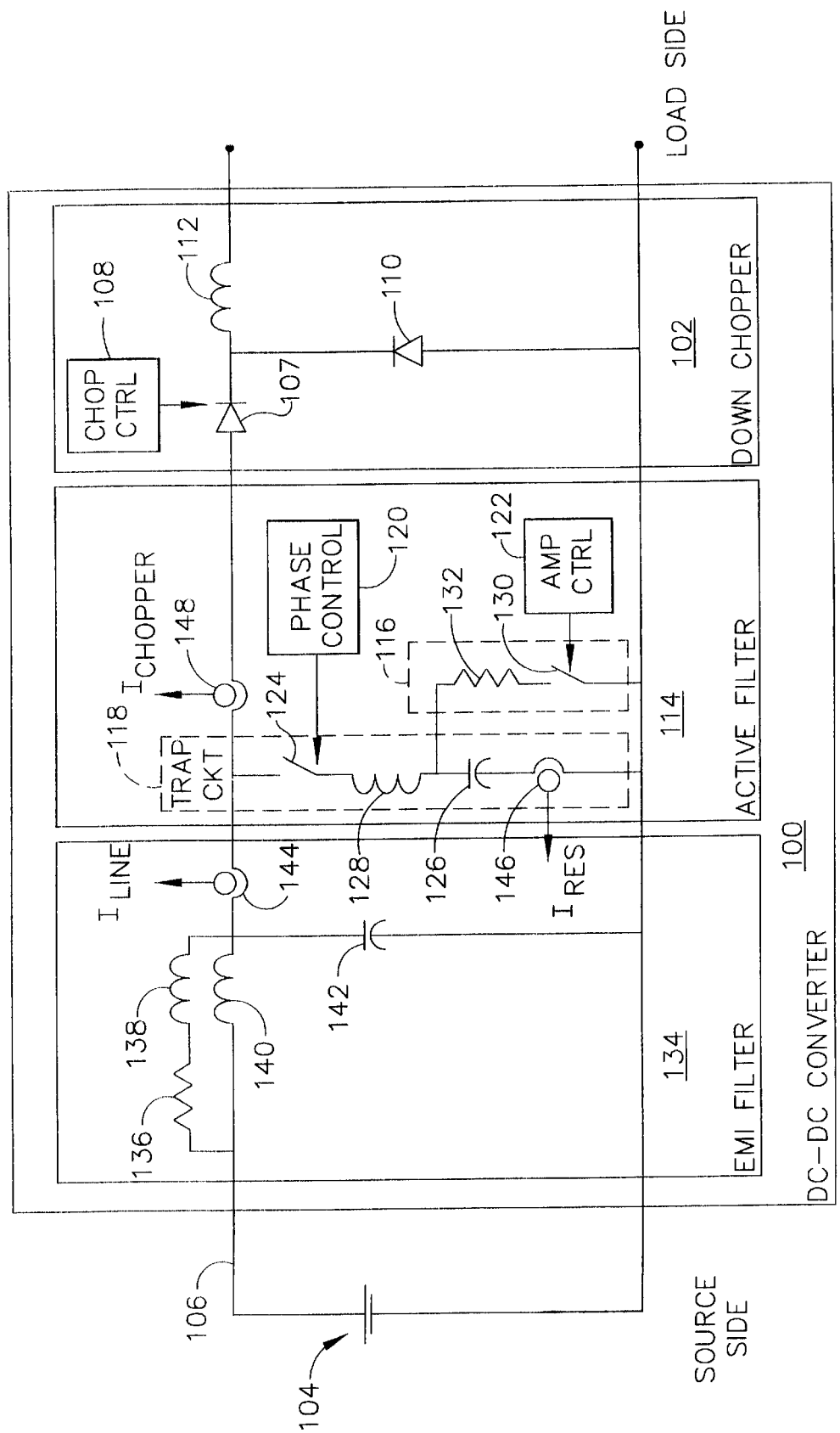
FIG. 1 is an illustration of a dc-dc converter including an active filter.

Reference is made to FIG. 1, which illustrates a dc-dc converter 100 including a conventional down chopper 102. A dc power source 104 is on the "source" side of the chopper 102, and a dc line 106 is also on the source side of the chopper. The chopper 102 modulates or "chops" the current from the dc source 104 and thereby reduces the average amplitude of the chopped current on the dc line 106. Current flowing through the chopper 102 is regulated by a chopper control 108. The chopper control 108 generates a DC signal that modulates a solid-state power switch 107 in the chopper 102. The chopper switch 107 is modulated such that (a) current flows from the dc source 104 onto the dc line 106 while the chopper switch 107 is closed; and (b) the current circulates through a freewheeling diode 110 while the chopper switch 107 is open. The reduction in current LINE on the dc line 106 is proportional to duty cycle of the chopping. An inductor 112 smoothes the current-ripple in the output of the chopper 102.

The on-off action of the chopper 102 creates a pulse-train type flow pattern in the chopper current $I_{CHOPPER}$ (see FIG. 4a). The interval T between pulses is proportional to the pulse width modulated ("PWM") or chopping frequency $f_{chop}$. That is, $T=1/f_{chop}$.

The chopper current $I_{CHOPPER}$ has a dc content and a harmonic frequency content. The harmonic frequency content includes a fundamental frequency component and its associated higher harmonic frequency components. The frequency of the fundamental is equal to the chopping frequency $f_{chop}$ of the chopper 102. To assure a small ripple current in the current on the dc line 106, the chopping frequency is relatively high (e.g., 20 kHz).

The dc-dc converter 100 further includes an active filter 114 for trapping (by canceling or at least by reducing) the fundamental frequency component that would otherwise appear in the line current $I_{LINE}$ on the dc line 106 without the active filter 114. The active filter 114 includes an adjustable power dissipating element 116, a tunable trap circuit 118 and a bidirectional first switch 124 coupled between the dc line 106 and the trap circuit 118. The trap circuit 118 includes a capacitor 126 and an inductor 128. The power-dissipating element 116 includes a second switch 130 and a resistor 132.

Figure 1A:
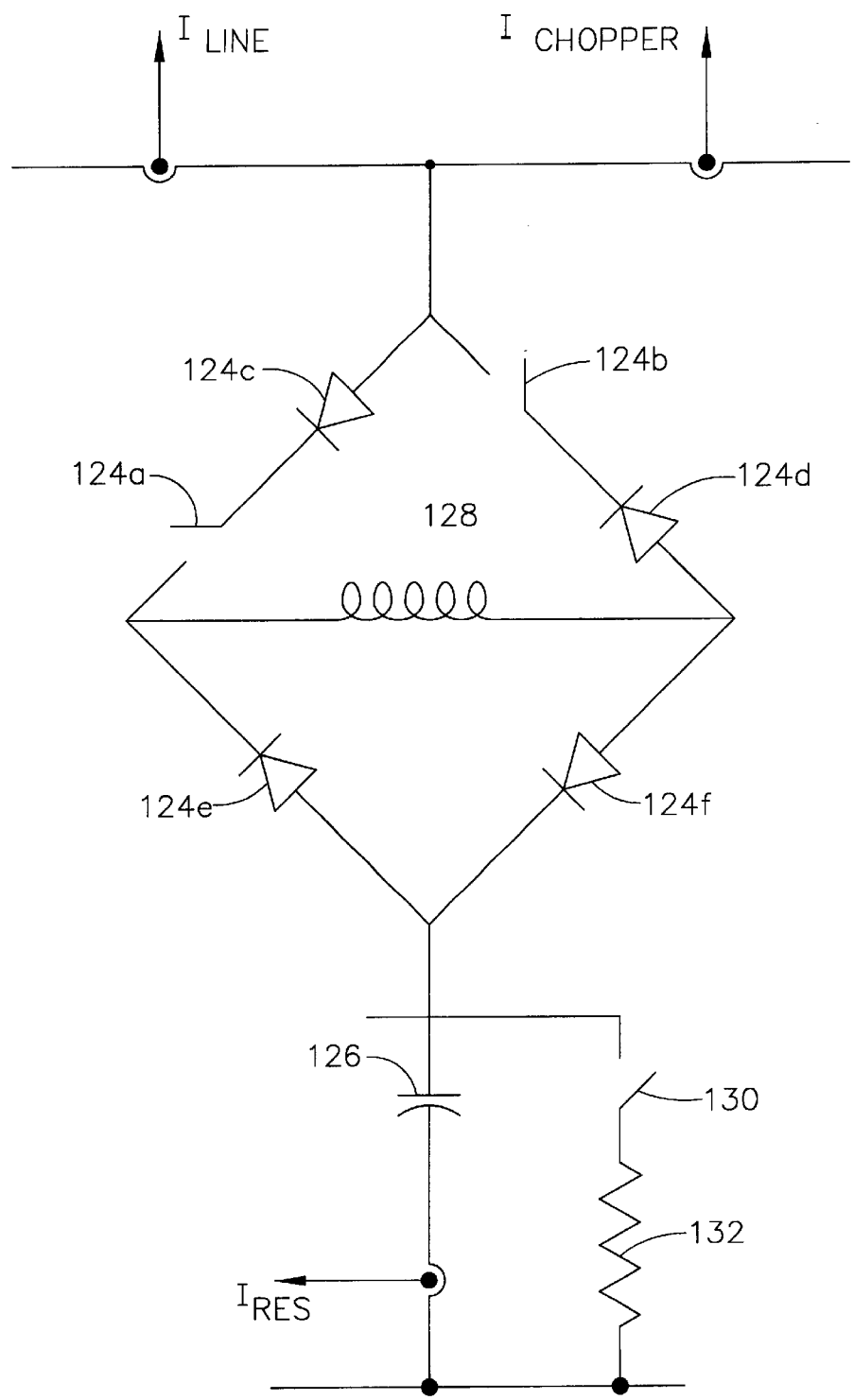
FIG. 1a is an illustration of a switch of the active filter.

The bi-directional switch 124 may have an H-bridge configuration operated during positive and negative resonant half-cycles, as shown in FIG. 1a. The bi-directional switch 124 includes transistor-type switches 124a and 124b, blocking diodes 124c and 124d, and reverse-current diodes 124e and 124f.

The first switch 124 is closed to couple the trap circuit 118 to the dc line 106. The second switch 130 is closed to discharge the capacitor 126 in the trap circuit 118.

The fundamental frequency component in the line current $I_{LINE}$ is minimized by two independent decoupled controls: a phase control 120 and an amplitude control 122. The phase control 122 modulates the first switch 124 to produce a resonant current $I_{RES}$. The amplitude control 120 modulates the second switch 130 to modulate the amplitude of the resonant current $I_{RES}$ in the trap circuit 118. This is accomplished by increasing or decreasing the charge on the capacitor 126 relative to the dc line 106.

Appropriate operation of the switches 124 and 130 produces a resonant current $I_{RES}$ that is in phase and equal in magnitude with the fundamental frequency component of the chopper current $I_{CHOPPER}$. To achieve this, phase and amplitude of the resonant current $I_{RES}$ are controlled. First, the phase of the resonant current $I_{RES}$ is controlled with respect to the fundamental frequency current component produced by the chopper 102. Second, the amplitude of the resonant current $I_{RES}$ is adjusted to match the amplitude of the fundamental frequency current component produced by the chopper 102 as the duty cycle of the chopper 102 is varied. As long as the resonant current $I_{RES}$ is in phase and has about the same amplitude as the fundamental frequency component of the chopper current $I_{CHOPPER}$, the fundamental frequency component will not appear in the current $I_{LINE}$ on dc line 106.

Figure 2:
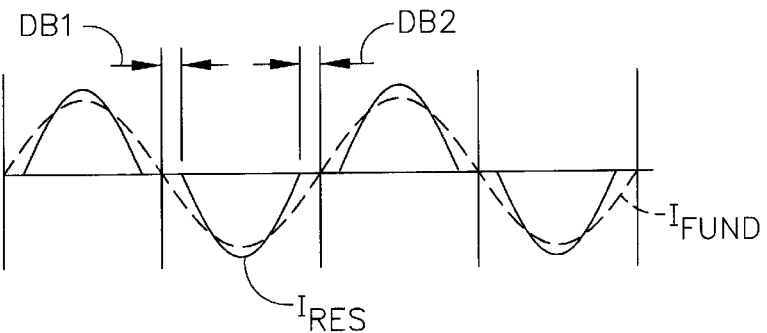
FIG. 2 is an illustration of a fundamental frequency component of resonant current and a symmetrical deadband.

Additional reference is made to FIG. 2. The phase of the resonant current $I_{RES}$ may be adjusted by creating a first dead-band DB1 before the first switch 124 is closed and a second dead band DB2 after the first switch is closed. During a deadband DB1 or DB2, little to no current flows through the trap circuit 118. The first deadband DB1 may be created by holding-off the gating of the first switch 124 (which is in series with the resonant LC components 126 and 128 of the trap circuit 118) every half cycle. The time during which the gating is held off may be adjusted so that the first and second deadbands DB1 and DB2 are symmetrical or asymmetrical.

The amplitude of the resonant current $I_{RES}$ may be adjusted by controlling the voltage of the capacitor 126 just prior to closing the first switch 124. This is accomplished by closing and then opening the second switch 130. Consider two cases: (1) the voltage Vcap across the capacitor 126 is less than the dc line voltage Vdc across a capacitor 142 (that is, Vcap<Vdc), and (2) the capacitor voltage Vcap is greater than the dc line voltage Vdc (that is, Vcap>Vdc). When Vcap<Vdc just prior to closing the first switch 124, the momentary closing of second switch 130 results in the capacitor 126 being (partially) discharged through the resistor 132 to a grounded negative potential and the peak of the subsequent resonant current $I_{RES}$ half-cycle will increase. Similarly, when Vcap>Vdc just prior to closing the switch 124, the momentary closing of second switch 130 (partially) discharges the capacitor 124 but, this time, the peak of the resonant current $I_{RES}$ during the subsequent resonant half-cycle will decrease.

The frequency of the resonant current $I_{RES}$ is selected to be higher (e.g., approximately 10% higher) than that of the chopper fundamental current $I_{FUND}$ produced by the chopper 12 to accommodate a range of amplitude and phase values that are associated with changes in the duty cycle of the chopper 12. That is, the higher frequency allows space for phase-shifting using the aforementioned deadbands DB1 and DB2.

The dc-dc converter 100 further includes a conventional EMI filter 134 coupled to the dc line 106. The EMI filter 134, which may have a standard construction (e.g., passive elements 136, 138, 140 and 142), is designed to filter the remaining harmonic components from the current $I_{LINE}$ on dc line 106. Since the active filter 114 has already trapped the fundamental frequency component from the line current $I_{LINE}$, the EMI filter 134 does not have to deal with the fundamental frequency component. Therefore, the size of inductors 138 and 140 in the EMI filter 134 can be reduced. Reducing the inductances of the EMI filter 134 can result in a significant decrease in the overall weight, since the reduction in the EMI filter inductor weight is greater than the corresponding weight increase due to the addition of the active filter 114. Thus, the combined weight of the active filter 114 and the EMI filter 134 is lower than the weight of a corresponding conventional EMI filter.

FIG. 1 shows that the three currents $I_{LINE}$, $I_{RES}$ and $I_{CHOPPER}$ are measured by three sensors 144, 146 and 148. However, the two sensors that measure the residual and chopper currents $I_{RES}$ and $I_{CHOPPER}$ are not used by the controls 120 and 122 of the active filter 114 and are shown only for descriptive purposes.

Figure 3:
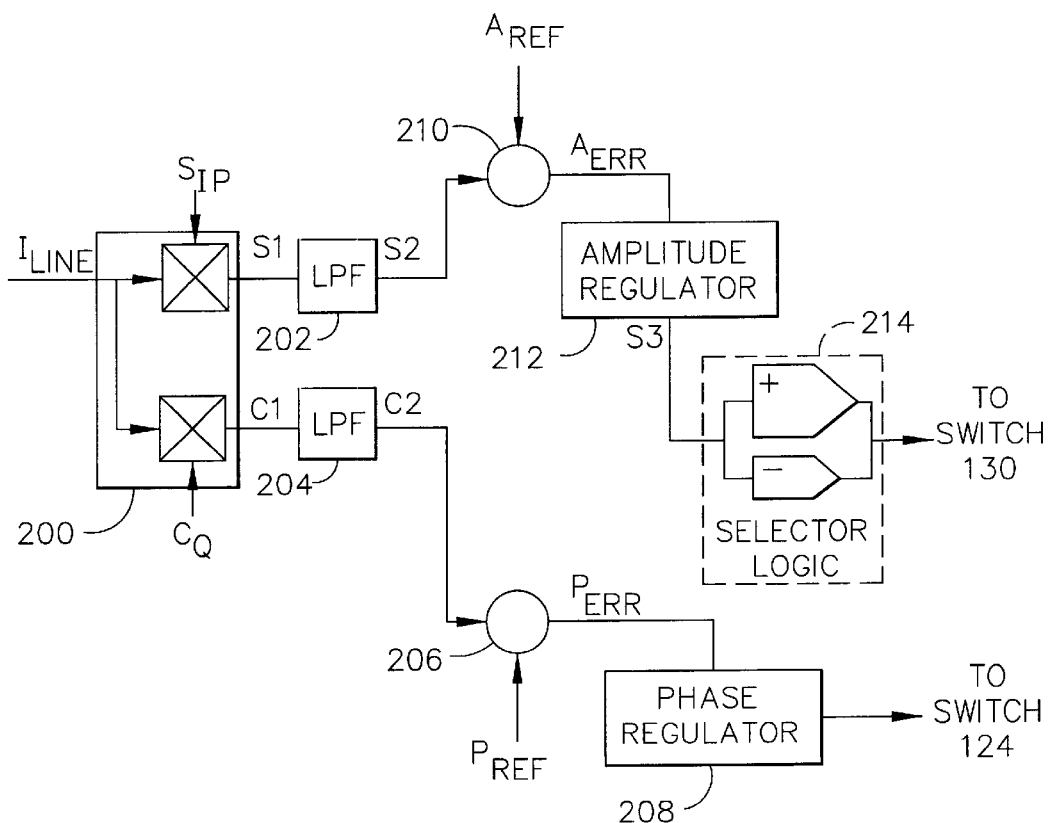
FIG. 3 is an illustration of phase and amplitude controls for the dc-dc converter of FIG. 1.

FIG. 3 shows the amplitude and phase controls 120 and 122 in greater detail. The fundamental in-phase and quadrature components of the line current $I_{LINE}$ are used to control the phase and amplitude of the resonant current $I_{RES}$ The fundamental in-phase and quadrature components of the line current $I_{LINE}$ are extracted by a synchronous demodulator 200, which heterodynes the measured line current $I_{LINE}$ with respect to two reference signals: (1) a sine wave $S_{IP}$ for phase control and (2) a cosine wave $C_Q$ for amplitude control. Both reference signals $S_{IP}$ and $C_Q$ are synchronized with respect to the PWM frequency of the chopper 102. FIG. 4a shows the duty cycle of the chopper 12, FIG. 4b shows the chopper fundamental current, FIG. 4c shows the sine wave reference signal $S_{IP}$, and FIG. 4d shows the cosine wave reference signal $C_Q$.

Output signals S1 and C1 of the synchronous demodulator 200 are passed through low pass filters 202 and 204 to produce two filtered signals S2 and C2. Due to the heterodyning action of the synchronous demodulator 200, the filtered signals S2 and C2 are decoupled dc signals that represent the in-phase and quadrature components of the fundamental frequency content of the line current $I_{LINE}$.

The filtered signal S2 representing the in-phase component may be used as amplitude feedback, and the filtered signal C2 representing the quadrature component may be used as phase feedback. A first summing element 206 generates an in-phase error signal $P_{ERR}$ representing the difference between the phase feedback C2 and a reference phase signal $P_{REF}$. The error signal $P_{ERR}$ is integrated over a complete "sampling period" by a phase shift regulator 208, where the sampling period equals a chopping frequency cycle. The output of the phase shift regulator 208 is used to determine when to close the first switch 124 and thereby adjust the symmetry of the dead-band until the phase error signal $P_{ERR}$ vanishes. When the reference phase signal $P_{REF}=0$ and the phase error signal $P_{ERR}$ vanishes, the dead-band should be symmetrical.

A second summing element 210 generates an amplitude error signal $A_{ERR}$ representing the difference between the amplitude feedback S2 and a reference amplitude signal $A_{REF}$. The amplitude error signal $A_{ERR}$ is integrated over a complete sampling period by an amplitude control regulator 212. An output of the amplitude control regulator 212 provides the signal S3. The magnitude and the polarity (sign) of the signal S3 is provided to selector logic 214 which is used to modulate the second switch 130 such that the amplitude error signal $A_{ERR}$ vanishes. The polarity of the signal S3 determines the resonant half-cycle in which the second switch 130 closed, and the magnitude of the signal S3 determines how long the second switch 130 shall be closed. For example, the second switch 130 remains closed while the magnitude is negative, but opens once the amplitude transitions from negative to positive.

Thus, the reference signals $P_{REF}$ and $A_{REF}$ indicate the desired amount of phase offset and amplitude. The reference signals $P_{REF}=0$ and $A_{REF}=0$ cause the complete trapping of the fundamental frequency component of the chopper current $I_{CHOPPER}$ by the active filter 14.

The invention is not limited to a synchronous demodulator for creating two independent, decoupled control signals that are orthogonal to each other with respect to a common synchronizing signal. Such orthogonal signals may be created by a Park-vector based decoupler.

Figure 5:
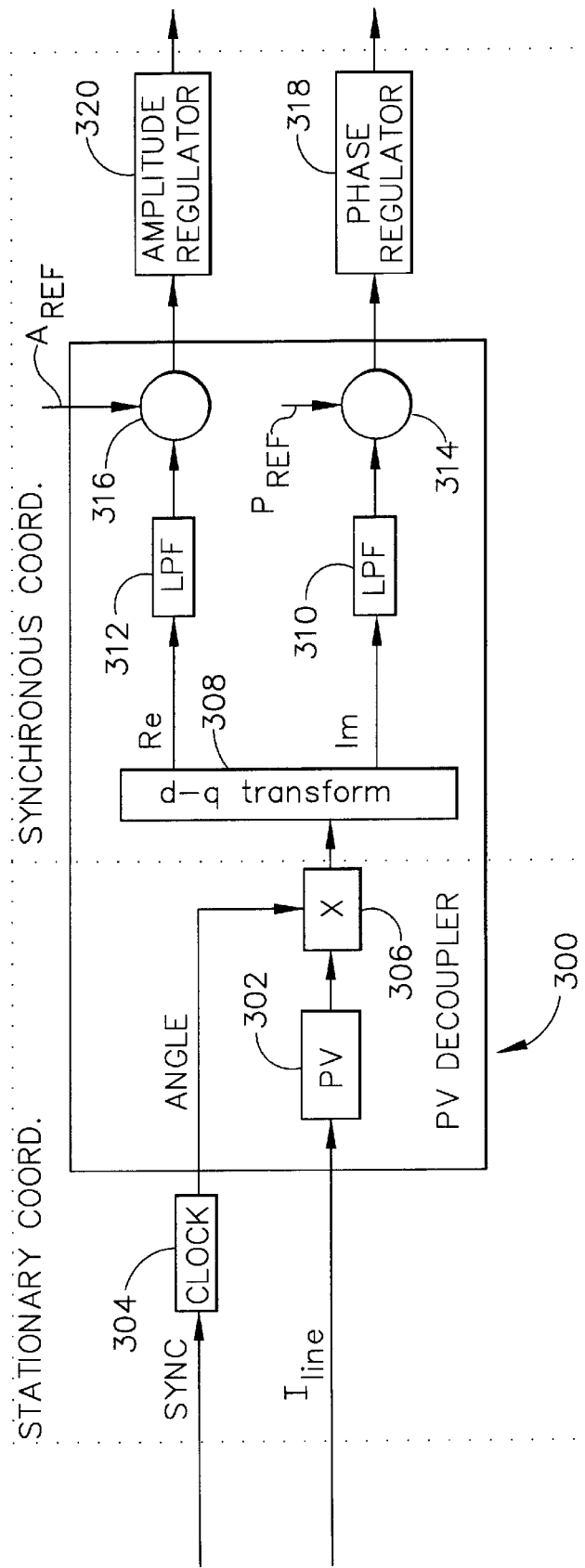
FIG. 5 is an illustration of alternative phase and amplitude controls for the dc-dc converter of FIG. 1.

Referring now to FIG. 5, a Park-vector based decoupler 300 is shown in a reference frame synchronized with respect to the chopper current $I_{CHOPPER}$. In this reference frame the d-components and the q-components of the Park-vectors are inherently decoupled. A Park vector inherently contains information on both the instantaneous magnitudes and phase relationship of a rotating field with respect to a reference coordinate system. A Park vector, in general, is a mathematical representation that describes the locus of an electrical quantity in the complex space domain (where time is a parameter). The current Park vector is defined with the vector's amplitude and the vector's direction in spatial relation to the reference coordinate system. A general discussion of Park vectors can be found in P. K. Kovacs, "Transient Phenomena in Electrical Machines," Elsevier Science Publishing Co. (1984).

A synchronization signal SYNC may be generated by the gating of the chopper switch 107 or by equivalent converter switching. A second block 304 converts the synchronization signal SYNC using a high frequency (e.g., greater than 100 MHz) clock (e.g. counter) to an equivalent angular value with respect to the repetition rate of the synchronization signal SYNC, where one repetition equals 360 degrees. A first block 302 represents a hardware or software implementation of a Park vector algorithm. A third block 306 represents a hardware or software implementation of a transformation algorithm which converts the Park vector signal (in stationary coordinates) to a complex vector (in a synchronous coordinates) with respect to the synchronization signal SYNC.

A fourth block 308 represents a hardware or software implementation for performing a d–q transformation. The d–q transformation includes a decomposition of the current Park vector with respect to the current voltage into in-phase and out-of-phase orthogonal components.

A first low pass filter 310 extracts the quadrature component C2 from the imaginary portion of the decomposition, and a second low pass filter 312 extracts the in-phase component S2 from real portion of the decomposition. Summing junctions 314 and 316 sum these components C2 and S2 with phase and amplitude reference signals $P_{REF}$ and $A_{REF}$ to produce error signals $A_{ERR}$ and $P_{ERR}$.

The error signals $P_{ERR}$ and $A_{ERR}$ are supplied to phase and amplitude regulators 318 and 320. An output of the phase regulator 318 is used to control the first switch 124. Sign and magnitude of an output of the amplitude regulator 320 are used to control the second switch 130.

The invention has been described above in connection with a dc-dc converter, and particularly in connection with a dc-dc converter including a down-chopper (buck-chopper). However, the invention is not so limited. The invention may also be applied to a dc-dc converter including an up-chopper (boost-chopper).

The invention may be used for dc-ac conversion, where the chopper down-chopper (buck-chopper). However, the invention is not so limited. The invention may also be applied to a dc-dc converter including an up-chopper (boost-chopper).

The invention may be used for dc-ac conversion, where the chopper is replaced by a three-phase inverter, and the duty cycle control is replaced by a PWM frequency commutation logic. The commutation logic generates commutation commands that cause the inverter to modulate the dc line current at the commutation frequency. The three-phase ac current may be supplied to a load such as permanent magnet motor, induction motor or switched reluctance motor.

The invention may also be used in combination with a switched reluctance machine that is used as a switched reluctance generator. The switched reluctance generator supplies ac current to an ac-dc converter. The ac-dc converter, in turn, supplies pulsed current on a dc line. An active filter removes the fundamental frequency component on the dc line. The active filter can reduce capacitor size at the output terminals of the dc line.

The common element in all of these embodiments is that the dc line current has a high frequency content at the commutation frequency and at the associated higher harmonics. The phase and amplitude controls just described are capable of filtering the fundamental frequency harmonic component since the fundamental frequency is an integer multiple of the PWM frequency.

The invention is not limited to an active filter having a single trap circuit. Additional trap circuits may be used to sink additional harmonic frequency components Accordingly, the invention is not limited to the specific embodiments described above. Instead, the invention is construed according to the claims that follow.

What is claimed is:

1. Apparatus comprising:
    a converter having a dc line, the converter being operable to provide a pulsed current on the dc line at a chopping frequency; and
    an active filter including a trap circuit, coupled to the dc line, for trapping a fundamental of the pulsed current, and a control for controlling phase and amplitude of trap circuit current to cancel ripple current produced by the converter.

2. The apparatus of claim 1, wherein the active filter includes a tuned trap circuit, the trap circuit being tuned to about the fundamental frequency; a first switch, coupled between the dc line and the trap circuit, for creating at least one deadband to adjust phase of current flowing through the trap circuit; and a power dissipation element and second switch coupled to the tuned trap circuit for diverting at least some stored current in the tuned trap circuit to control amplitude of the current flowing through the tuned trap circuit.

3. The apparatus of claim 2, wherein the first switch has an H-bridge configuration.

4. The apparatus of claim 2, wherein the trap circuit is tuned to a frequency that is about 10% higher than an integer multiple of the chopping frequency.

5. The apparatus of claim 2, further comprising a controller for creating two independent, decoupled control signals that are orthogonal to each other with respect to a common synchronizing signal, a first of the two signals being used to control the first switch, a second of the two signals being used to control the second switch, whereby the first signal is used to control the phase and the second signal is used to control the amplitude.

6. The apparatus of claim 5, wherein the controller includes a synchronous demodulator for creating the two independent, decoupled control signals.

7. The apparatus of claim 5, wherein the controller includes a Park vector-based decoupler for creating the two independent, decoupled control signals.

8. The apparatus of claim 5, further comprising an EMI filter, coupled to the dc line, for attenuating at least some higher harmonic frequency components of the pulsed current on the dc line.

9. An active filter for a converter having a dc line, the converter being operable to provide a pulsed current on the dc line at a chopping frequency, the active filter comprising:
    a trap circuit tuned to a fundamental frequency component of the pulsed current;
    a first switch, coupled between the dc line and the trap circuit;
    a controller for causing the first switch to create at least one deadband to adjust phase of current flowing through the trap circuit; and a power dissipation element and second switch coupled to the trap circuit, the controller controlling the second switch to divert at least some stored current in the trap circuit, the current being diverted to control amplitude of the current flowing through the tuned trap circuit;

whereby the active filter is operable to trap the fundamental component of the pulsed current.

10. The filter of claim 9, wherein the first switch has an H-bridge configuration.

11. The filter of claim 9, wherein the trap circuit is tuned to a frequency that is about 10% higher than an integer multiple of the chopping frequency.

12. The filter of claim 9, further wherein the controller creates two independent, decoupled control signals that are orthogonal to each other with respect to a common synchronizing signal, a first of the two signals being used to control the first switch, a second of the two signals being used to control the second switch, whereby the first signal is used to control the phase and the second signal is used to control the amplitude.

13. The filter of claim 12, wherein the controller includes a synchronous demodulator for creating the two independent, decoupled control signals.

14. The filter of claim 12, wherein the controller includes a Park vector-based decoupler for creating the two independent, decoupled control signals.

15. A method of filtering pulsed current on a dc line, the method comprising:

trapping a fundamental component of the switched current;

using a trap circuit to create a resonant frequency and at least one deadband in the trapped current, the deadband being controlled to control phase of the trapped current; and diverting at least some of the trapped current to control amplitude of the switched current;

whereby phase and amplitude of the trapped current can be made to cancel the fundamental of the switched current.

16. The method of claim 15, wherein the trap circuit includes a charge storage device, and wherein the method includes the steps of connecting and disconnecting the trap circuit to the dc line to control the phase; and connecting and disconnecting a power dissipation element across the charge storage device to control the amplitude; whereby the capacitor is discharged through the power dissipation element when the power dissipation element is connected across the charge storage device.

17. The filter of claim 16, further comprising the step of creating two independent, decoupled control signals that are orthogonal to each other with respect to a common synchronizing signal, a first of the two signals being used to determine when the trap circuit is connected to the dc line, a second of the two signals being used to determine when the power dissipation element is connected across the charge storage device.

18. The filter of claim 17, wherein synchronous demodulation is used to create the two independent, decoupled control signals.

19. The method of claim 17, wherein Park vector-based decoupling is used to create the two independent, decoupled control signals.

20. The method of claim 15, further comprising the step of using an EMI filter to attenuate at least some higher harmonic frequency components of the pulsed current on the dc line.

* * * * *